H. B. WELLMAN.
Lamp.
No. 5,139. Reissued Nov. 5, 1872.
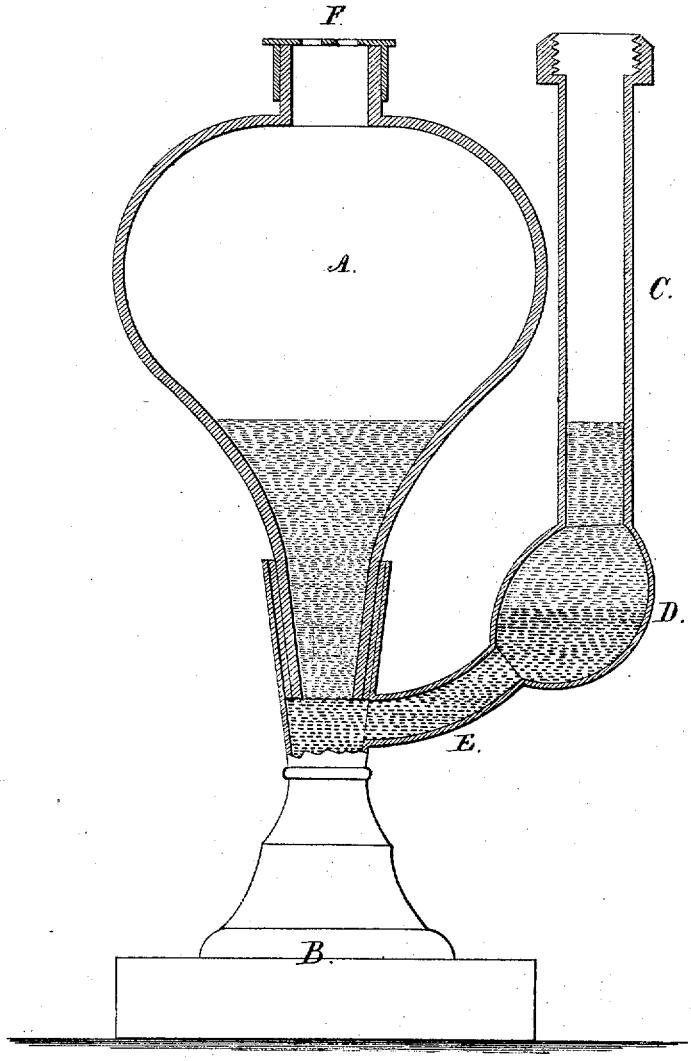
INVENTOR
Chas. H. Smith
Geo. D. Walker. Witnesses.
H. B. Wellman,
Per. Lemuel W. Serrell
ATTY.
AM. PHOTO-LITHOGRAPHIC CO. N.Y. (OSBORNE'S PROCESS.)

UNITED STATES PATENT OFFICE.

HIRAM B. WELLMAN, OF INDIANAPOLIS, INDIANA, ASSIGNOR TO CHARLES F. A. HINRICHS.

IMPROVEMENT IN LAMPS.

Specification forming part of Letters Patent No. 73,145, dated January 7, 1868; reissue No. 5,139, dated November 5, 1872.

*To all whom it may concern:*

Be it known that I, HIRAM B. WELLMAN, formerly of Allegheny City, in the State of Pennsylvania, now of Indianapolis, in the State of Indiana, have invented an Improvement in Lamps, of which the following is a specification:

This invention relates to a lamp in which there is a reservoir for the supply of oil to the burner, and a tube leading from that reservoir to the tube containing the wick.

The feature of this invention is the employment of water in the tube leading from the reservoir to the burner as a means for separating the combustible liquid of the reservoir from that in contact with the wick, so as to lessen the risk of accident from the oil of the reservoir becoming heated or ignited.

In the drawing I have represented, by a vertical section, a lamp made for receiving water between the reservoir and burner.

The reservoir A is of suitable size and shape. I have shown it as supported by a base, B, and provided with a filling-cap at F. The tube C is adapted to receiving the wick and burner of any desired character, and a chimney may be used with such burner. I have shown a screw at the upper end of the wick-tube C for the reception of the burner. The tube C is connected with the reservoir A by a tube, E, in which I have shown an enlargement or chamber, D.

To use this lamp, water is poured into the same sufficiently to form a separation of the oil in the reservoir A from that in the wick-tube C, so that fire cannot pass from one to the other, and there will be but little heat communicated, because the evaporation from the water tempers the heat.

It will be apparent that the oil in the reservoir A floats upon the water, and by its column depresses the water at that side of the tube A, driving the same up into the chamber D until the oil can flow through the water and rise in the tube C to its proper level, and as the oil in C is consumed from time to time there is a fresh supply passing through the water, as aforesaid.

I claim as my invention—

A lamp with a supply-reservoir, connected by a tube with the wick or burner tube, and non-inflammable liquid introduced in such tube, substantially as and for the purposes set forth.

Signed by me this 25th day of July, A. D. 1872.

H. B. WELLMAN.

Witnesses:

R. D. DOYLE,

DAVID KREGELO.